ян. 20, 1959

United States Patent Office
2,870,175

2,870,175
NEW CYCLOSTEROIDS

Aurelio Romeo, Rome, Italy, assignor to Ciba Pharmaceutical Products Inc., Summit, N. J.

No Drawing. Application May 15, 1958
Serial No. 735,377

Claims priority, application Switzerland May 27, 1957

3 Claims. (Cl. 260—397.5)

This invention provides as new compounds $\Delta^6$-3:5-cycloandrostenes which contain in the 17$\beta$-position a hydroxyl group or a hydroxyl group and a lower aliphatic hydrocarbon radical, such as a lower alkyl or lower alkenyl radical, and esters thereof.

The aforesaid $\Delta^6$-3:5-cyclo-androstenes, for example, $\Delta^6$-3:5-cyclo-17$\beta$-hydroxy-androstene, $\Delta^6$-3:5-cyclo-17$\beta$-hydroxy-17$\alpha$-methyl-, -17$\alpha$-ethyl-, -17$\alpha$-vinyl-, -17$\alpha$-ethinyl-, -17$\alpha$-propyl-, -17$\alpha$-allyl-, -17$\alpha$-isobutyl or -17$\alpha$-methallyl-androstene, and functional derivatives thereof, are of therapeutic interest owing to their anabolic and hypotensive action and are useful, for example in the treatment of cases which require an increased protein synthesis or of hypertensive conditions.

The new $\Delta^6$-3:5-cyclo-androstenes can be made by methods in themselves known. Thus, in a 3:5-cyclo-17-oxoandrostene compound, which contains in the 6:7-position a double bond or in the 6-position an alkoxy group, such as a lower alkoxy group, the 17-oxo group may be reduced to the hydroxyl group. Reduction of the 17-oxo-group may be carried out in various ways. When it is carried out by means of a complex light metal hydride, for example, NaBH$_4$, alone or together with aluminum chloride or lithium bromide, B$_2$H$_6$, LiAlH$_4$, LiAlH(OCH$_3$)$_3$ or

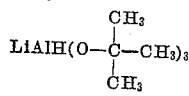

there is obtained $\Delta^6$-3:5-cyclo-17$\beta$-hydroxy-androstene. When the starting material contains in the 6-position an alkoxy group, such as a lower alkoxy group, for example, the methoxy or ethoxy group, this substituent is split off during the reduction with the formation of a 6:7-double bond.

There may also be used for reducing the 17-oxo-group organo-metal compounds containing a lower aliphatic hydrocarbon radical of the kind mentioned above. In this case simultanseously with the reduction of the 17-oxo group to the 17$\beta$-hydroxyl group there is introduced into the 17$\alpha$ - position a lower aliphatic hydrocarbon radical, such as a lower alkyl or a lower alkenyl group, e. g. a methyl, ethyl, vinyl, ethinyl, propyl, allyl, isopropyl or methallyl group. In this case also if a 6-alkoxy group is present in the starting material this group is split off with the formation of a 6:7-double bond.

Finally the products of the invention can also be obtained by converting a $\Delta^5$-3$\beta$-hydroxy-androstene, which contains in the 17$\beta$-position a hydroxyl group or a hydroxyl group and a lower aliphatic hydrocarbon radical, by a method in itself known, for example, by treatment of the p-toluene-sulfonic acid ester of a $\Delta^5$-3$\beta$-hydroxy-androstene compound with an alkali metal salt of a lower alkanoic acid, e. g. potassium acetate, in the presence of an alkanol, such as a lower alkanol, e. g. methanol or ethanol, into the corresponding 3:5-cyclo-6-alkoxy-androstane, and converting the latter by means of a basic agent, for example, aluminum oxide, into the corresponding $\Delta^6$-3:5-cyclo-androstene. It is especially suitable to use for splitting off the 6-alkoxy group aluminum oxide of activity I (according to Brockmann). It is of advantage to dissolve the alkoxy-derivative in an organic solvent, for example, hexane or other hydrocarbon, and to treat the solution with 5 to 30 times the quantity of aluminum oxide at room temperature.

The conversion of a 17$\alpha$-allyl group into a 17$\alpha$-propyl group or of a 17$\alpha$-methallyl group into a 17$\alpha$-isobutyl group is carried out by mild catalytic reduction.

The products so obtained can be converted in known manner into esters thereof. The acid radicals of such esters may be those of organic acids, such as aliphatic, alicyclic, araliphatic, aromatic or heterocyclic carboxylic acids, thion-carboxylic acids, thiol-carboxylic acids or sulfonic acids, for example, acetic acid, propionic acid, butyric acid, caproic acid, oenanthic acid, undecylenic acid, $\beta$-cyclopropyl-propionic acid, $\beta$-phenyl-propionic acid, succinic acid, glutaric acid, phthalic acid, hydroxybenzoic acids, amino-carboxylic aids, for example derivatives of amino-acetic acid, or keto-carboxylic acids, for example, acetoacetic acid, laevulinic acid, and also sulfuric acids or phosphoric acids.

The following examples illustrate the invention:

Example 1

1 gram of $\Delta^6$-3:5-cyclo-17-oxo-androstene is dissolved in 50 cc. of absolute diethyl ether, and the solution is added to 1.4 grams of LiAlH$_4$ in 50 cc. of diethyl ether. After boiling the whole for 3 hours, it is allowed to cool and stand overnight and then, after cooling the mixture with ice, the excess of reducing agent is decomposed by the addition of ethyl acetate. The ethereal ethyl acetate solution is filtered, and then washed with water, dried and evaporated. By crystallizing the residue from hexane there is obtained 0.7 gram of $\Delta^6$-3:5-cyclo-17$\beta$-hydroxy-androstene melting at 137–138° C., and having the specific rotation [$\alpha$]$_D$=—55°.

The starting material used above can be prepared, for example, as follows: 0.5 gram of the known 3:5-cyclo-6-methoxy-17-oxo-androstane in solution in hexane and 15 grams of aluminum oxide of activity I (according to Brockmann) are agitated in a closed vessel at room temperature. After 130 hours the aluminum oxide is filtered off and the hexane solution is evaporated. By recrystallizing the residue from methanol there is obtained $\Delta^6$-3:5-cyclo-17-oxo-androstene melting at 137–138° C.

Example 2

1.5 grams of $\Delta^6$-3:5-cyclo-17-oxo-androstene are dissolved in 80 cc. of absolute diethyl ether and the solution is added to a solution of methyl magnesium iodide (obtained from 1.05 grams of magnesium, 2.65 cc. of methyl iodide and 20 cc. of diethyl ether). After being allowed to stand overnight the reaction mixture is cooled, dilute hydrchloric acid is added, the ethereal solution is separated, washed with water and dried over sodium sulfate, and the solvent is evaporated. By crystallizing the residue from benzine there is obtained $\Delta^6$-3:5-cyclo-17$\beta$-hydroxy-17$\alpha$-methyl-androstene melting at 121-123° C.

The ethyl magnesium iodide or the allyl magnesium bromide may be used instead of the methyl magnesium iodide and the corresponding $\Delta^6$-3:5-cyclo-17$\beta$-hydroxy-17$\alpha$-ethyl-androstene or $\Delta^6$-3:5-cyclo-17$\beta$-hydroxy-17$\alpha$-allyl-androstene obtained.

What is claimed is:

1. A member of the group consisting of $\Delta^6$-3:5-cyclo-androstene the 17- position of which is substituted by a member of the group consisting of —H(—$\beta$—OH) and —R(—$\beta$—OH) in which R stands for a lower aliphatic hydrocarbon radical and the esters thereof.
2. $\Delta^6$-3:5-cyclo-17$\beta$-hydroxy-androstene.
3. $\Delta^6$-3:5-cyclo-17$\beta$-hydroxy-17$\alpha$-methyl-androstene.

No references cited.